May 6, 1930.  V. BENDIX  1,757,071

FLUID OPERATED BRAKE

Filed June 15, 1925

INVENTOR
VINCENT BENDIX
BY
*M. W. McConkey*
ATTORNEY

Patented May 6, 1930

1,757,071

UNITED STATES PATENT OFFICE

VINCENT BENDIX, OF CHICAGO, ILLINOIS, ASSIGNOR TO BENDIX BRAKE COMPANY, OF CHICAGO, ILLINOIS, A CORPORATION OF ILLINOIS

FLUID-OPERATED BRAKE

Application filed June 15, 1925. Serial No. 37,180.

This invention relates to hydraulic and other fluid-power brakes, and is illustrated as embodied in an automobile brake. An object of the invention is to provide fluid-power brake-operating means which is readily interchangeable with mechanical controls.

In one desirable arrangement, the fluid-power actuator, which is preferably arranged inside of the brake shoes or their equivalent, engages a part suitable for use with a mechanical control, and which is shown as a lever pivoted on the unanchored end of one shoe and engaging the unanchored end of the adjacent shoe.

I consider as an important feature the arrangement to cause greater movement in one direction than the other, thus adapting the control for use with a brake of the type in which one part of the friction means, normally resisting rearward movement of the car, extends through less than 180°, while that part (shown as a pair of connected shoes) which resists forward movement is arranged to extend substantially more than 180°.

The above and other objects and features will be apparent from the following description of one illustrative embodiment of the invention shown in the accompanying drawings, in which.

Figure 1:
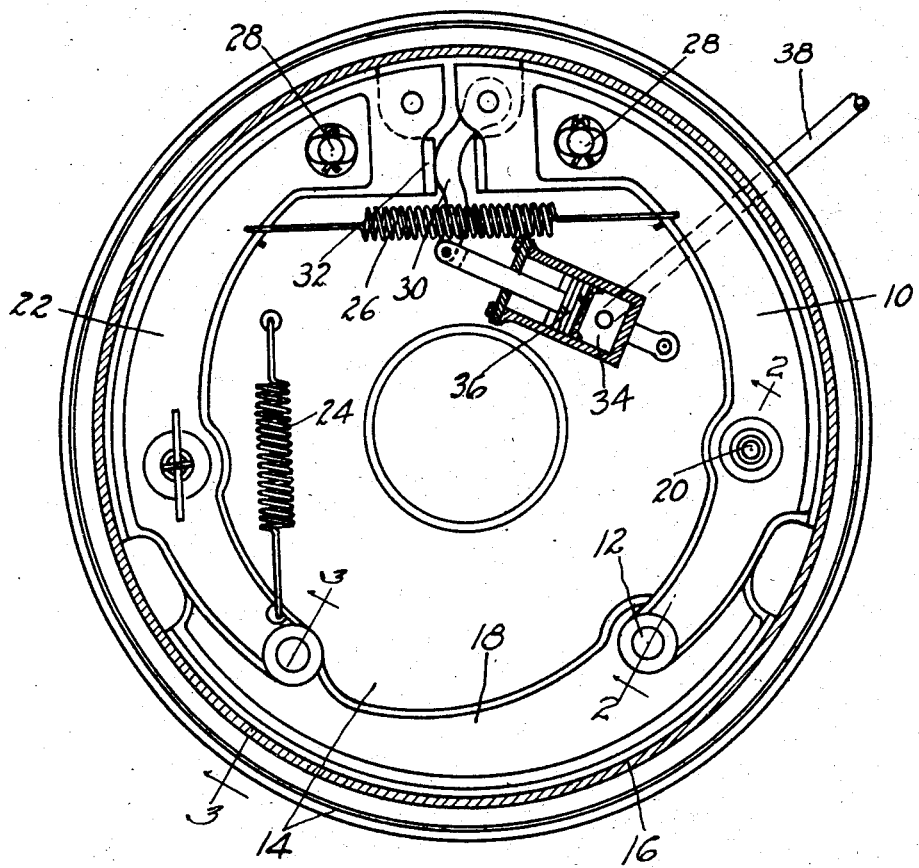
Figure 1 is a vertical section through the brake just inside of the wheel, showing the shoes in side elevation.
Figure 3:
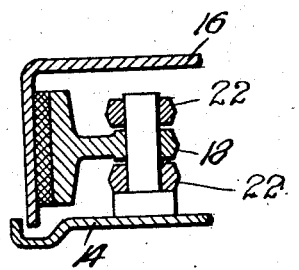
Figure 3 is a partial section on the line 3—3 of Figure 1, showing the connection between two of the shoes.
Figure 2:
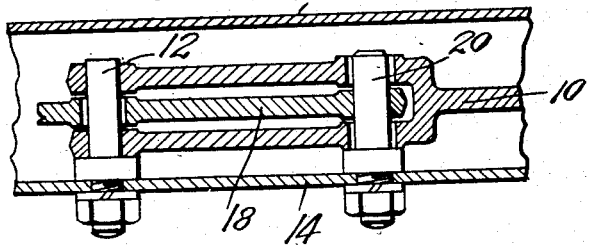
Figure 2 is a partial section on the line 2—2 of Figure 1, showing the brake anchors.

In the arrangement selected for illustration, the brake comprises a single friction member or shoe 10 anchored at 12 on a backing plate 14, and engageable with the inside of a drum 16 to resist rearward movement of the car. Forward movement is retarded by a shoe 18 anchored at 20 and operated by circumferential movement of a servo shoe 22, pivotally connected thereto, against the resistance of a spring 24.

Shoes 10 and 22 are forked at their ends to straddle the ends of shoe 18. Anchor 12 passes through a large clearance opening in the web of shoe 18, and anchor 20 passes through similar openings in the arms forming the fork of shoe 10. A spring 26 urges the shoes away from the drum, and steady rests 28 position the free ends of the shoes laterally.

The shoes are expanded against the drum by a generally radial operating member shown as a lever 30 pivoted to the end of shoe 10 and engaging a wear plate 32 on the end of shoe 22. In order that shoes 10 and 22 may be interchangeable, I prefer that both of them have wear plates, or be formed to receive wear plates, and that both of them be formed to be pivoted to lever 30.

The inner end of lever 30 is shown pivotally connected to a hydraulic actuator arranged inside of the shoes, and which may include a cylinder 34 and piston 36 or suitable equivalents. The opposite end of the actuator is pivotally connected to the backing plate 14, thus permitting a sort of toggle action with lever 30, and allowing approximately twice the movement to shoe 22 as is given shoe 10. This relative movement of the shoes 22 and 10 is effected by virtue of the fact that in applying the brake, the end of the shoe 22 must move a sufficient distance to take up the lining clearance of both shoes 18 and 22. That this action takes place is obvious from the movement of the pivot between the two shoes, said movement taking up the lining clearance of shoe 18. In addition to this movement, shoe 22 must take up its own lining clearance; therefore, the free end of shoe 22 has a movement equal to the two shoes 22 and 18, which is approximately twice the movement of shoe 10. Fluid under pressure is supplied to the actuator through a suitable conduit 38.

While one illustrative embodiment of the invention has been described in detail, it is not my intention to limit its scope to that particular embodiment, or otherwise than by the terms of the appended claims.

I claim:

1. A brake comprising, in combination, a drum, a support, an expansible friction device within the drum, having separated free ends, operating mechanism disposed within substantially a 90° segment of the drum comprising a pair of pivotally connected arms, one arm extending between the ends of the friction device and pivotally connected at its outer end to one end of the friction device and engaging directly the other end of the friction device, and a fluid piston and cylinder assembly arranged at the outer end of the other arm, said cylinder being pivoted to the support and said piston pivotally connected with the outer end of the arm.

2. A brake comprising, in combination, a drum, shoes arranged for expansion against the drum, a support, L-shaped operating mechanism mounted within a 90° segment of the drum comprising two pivotally connected arms, one arm extending between the ends of the shoes and pivotally connected with the end of one shoe and directly engaged against the end of the other shoe to actuate the shoes, a piston mounted on the outer end of the other arm and a fluid pressure cylinder within which said piston is mounted pivoted at its outer end to the support.

3. A brake comprising, in combination, a drum, shoes arranged for expansion against the drum, an operating member directly pivoted on the end of one shoe and directly engaging the end of the adjacent shoe and extending radially inward, a support and a fluid-power actuator pivotally connected at one end to the support and at the opposite end to the inner end of said member and rocking said member to pry the shoes apart to apply the brake.

4. A brake comprising, in combination, a drum, a friction device anchored at one end within the drum and extending substantially less than 180°, connected friction devices anchored adjacent the anchored end of the first friction device and extending more than 180°, an operator for said friction devices, and fluid-power means for operating the operator arranged to permit the connected devices a greater movement in applying the brake than said single device.

5. A brake comprising, in combination, a drum, a friction device anchored at one end within the drum and extending substantially less than 180°, connected friction devices anchored between the ends of the first friction device and extending more than 180°, operating mechanism comprising an arm extending between the ends of said devices pivotally connected to the single device and directly engaging the connected devices, a fluid power actuator having a piston connected with said arm to actuate the same to apply the friction devices.

6. A brake comprising, in combination, a drum, a support, a single reverse shoe anchored on the support, a pair of connected forward shoes anchored on the support, an operator engaging adjacent their unanchored ends the single shoe and the connected shoes and having an operating arm extending radially inward, and a fluid-power actuator pivoted at its ends to said arm and to the support and arranged inside of the shoes.

7. A brake comprising, in combination, a drum, a support, a single reverse shoe anchored on the support, a pair of connected forward shoes anchored on the support, a lever pivoted on one unanchored end of said shoes and engaging the other unanchored end, and having an operating part extending radially inward, and a fluid-power actuator pivoted at its ends to said part and to the support and arranged inside of the shoes.

In testimony whereof I have hereunto signed my name.

VINCENT BENDIX.